No. 622,436. Patented Apr. 4, 1899.
J. E. BANCROFT.
REPAIR PATCH FOR RUBBER TIRES.
(Application filed Jan. 13, 1899.)

(No Model.)

Witnesses—
Herman H. Martin
W. F. Suffen

Inventor—
James E. Bancroft
By Wm. K. Terry
Atty.

THE NORRIS PETERS CO., PHOTO-LITHO., WASHINGTON, D. C.

United States Patent Office.

JAMES E. BANCROFT, OF TOLEDO, OHIO, ASSIGNOR TO THE NATIONAL CEMENT AND RUBBER MANUFACTURING COMPANY, OF SAME PLACE.

REPAIR-PATCH FOR RUBBER TIRES.

SPECIFICATION forming part of Letters Patent No. 622,436, dated April 4, 1899.

Application filed January 13, 1899. Serial No. 702,036. (No model.)

*To all whom it may concern:*

Be it known that I, JAMES E. BANCROFT, of Toledo, county of Lucas, State of Ohio, have invented new and useful Improvements in Repair-Patches for Rubber Tires; and I do hereby declare that the following is a full, clear, and exact description of the invention, which will enable others skilled in the art to which it appertains to make and use the same, reference being had to the accompanying drawings, and to the figures of reference marked thereon, which form a part of this specification.

My invention relates to a repair-patch for rubber tires, and has for its object to provide an article of the above character comprising a convex disk having formed centrally therein a pocket adapted to receive and secure the unvulcanized rubber and also adapted to exclude air from the surfaces to be vulcanized during the process of repairing the tire.

A further object is to provide a disk adapted to reinforce the wall of the tire surrounding a puncture and provide means for intimately combining the disk to the plug before and after the vulcanization of the latter.

Figure 1:
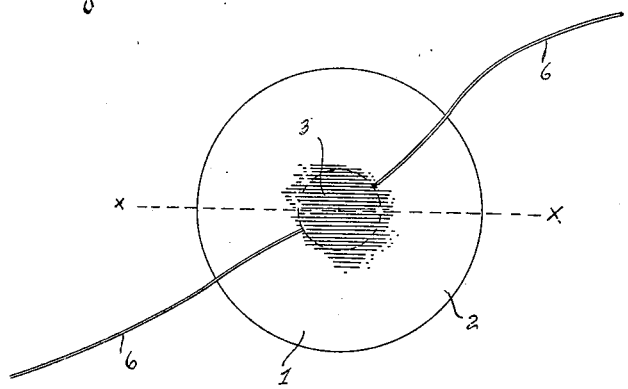
Figure 2:
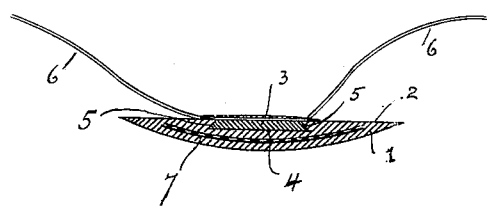
Figure 3:
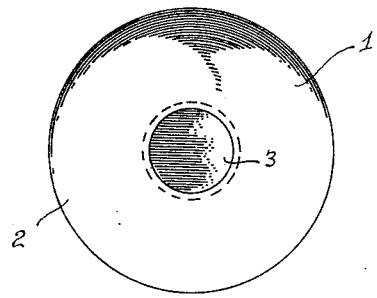
Figure 4:
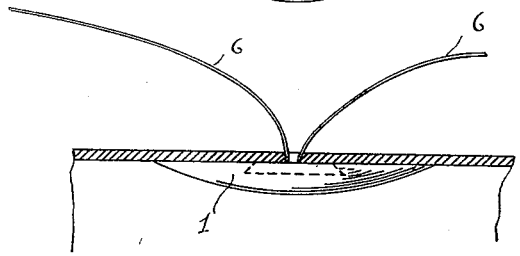

In the drawings, Figure 1 is an elevation of a patch constructed in accordance with my invention. Fig. 2 is a cross-section on the line X X, Fig. 1. Fig. 3 is an elevation of the disk, showing the pocket for the unvulcanized rubber. Fig. 4 is an illustration showing the application of the patch to a puncture in the tire.

In carrying out my invention I employ a vulcanized disk 1, having preferably a convex formation and formed upon the flat face 2 a pocket 3, which has an increased area at the bottom 4, whereby the walls 5 of the pocket are converging toward the mouth. The pocket is thereby adapted to securely hold the unvulcanized rubber introduced therein and closely combine the materials after being vulcanized in position within the tire.

During the process of vulcanization the flat face of the disk 1 is drawn in contact with the tire by means of strings 6, embedded in the unvulcanized rubber, the whole being inserted within the tire through the puncture. By drawing the disk closely against the wall of the tire the air is excluded from the surfaces to be vulcanized and insuring thereby a perfect process, which fills all interstices and serrations of the puncture and completely combines the materials of which the repair-patch is formed to the tire, the patch thereby reinforcing the tire-wall around the puncture located therein, and also insuring an air-tight closure by relieving the pressure over the puncture by means of the convex disk 1, formed of vulcanized rubber.

7 designates a fabric embedded in the vulcanized rubber disk and adapted to reinforce the same, and being embedded centrally therein it cannot become detached from the plug during vulcanizing and consequent softening of the rubber.

The repair-patch is constructed as an article of commerce, as shown in Fig. 1, the unvulcanized rubber being introduced into the pocket of the disk 1 before shipping or when needed.

What I claim is—

1. In a repair-patch for rubber tires, a disk of vulcanized rubber, a pocket formed upon its face, having converging walls toward the mouth and adapted to hold unvulcanized rubber having a string embedded therein.

2. In a repair-patch for rubber tires, a disk of vulcanized rubber, a fabric embedded therein in central position, a recess formed in the face of the disk having converging walls, unvulcanized rubber introduced into the recess and completely filling the same, and a string embedded in the unvulcanized rubber, both ends of which project freely beyond the rubber.

In testimony that I claim the foregoing as my own I hereby affix my signature in presence of two witnesses.

JAMES E. BANCROFT.

Witnesses:
WM. K. TERRY,
E. P. HUBBELL.